United States Patent
Parekh et al.

(10) Patent No.: US 10,783,537 B1
(45) Date of Patent: Sep. 22, 2020

(54) APPARATUS AND METHOD FOR ENHANCED MESSAGE TARGETING

(71) Applicant: Groupon, Inc., Chicago, IL (US)

(72) Inventors: Rajesh Girish Parekh, San Jose, CA (US); Raju Balakrishnan, Sunnyvale, CA (US); Guoxian Zhang, Fremont, CA (US); Prashant Gaurav, Mountain View, CA (US)

(73) Assignee: Groupon, Inc., Chicago, IL (US)

( * ) Notice: Subject to any disclaimer, the term of this patent is extended or adjusted under 35 U.S.C. 154(b) by 586 days.

(21) Appl. No.: 15/083,441

(22) Filed: Mar. 29, 2016

Related U.S. Application Data

(60) Provisional application No. 62/140,030, filed on Mar. 30, 2015, provisional application No. 62/140,025, filed on Mar. 30, 2015.

(51) Int. Cl.
*G06Q 30/02* (2012.01)
*G06N 20/00* (2019.01)

(52) U.S. Cl.
CPC ......... *G06Q 30/0211* (2013.01); *G06N 20/00* (2019.01); *G06Q 30/0201* (2013.01)

(58) Field of Classification Search
USPC .... 706/12, 13; 705/26.7, 7.29, 14.43, 14.21; 707/748, 700
See application file for complete search history.

(56) References Cited

U.S. PATENT DOCUMENTS

| | | | |
|---|---|---|---|
| 6,912,533 B1* | 6/2005 | Hornick | G06F 9/505 707/700 |
| 7,698,235 B2* | 4/2010 | Kuroiwa | G06N 99/005 706/12 |
| 7,756,879 B2* | 7/2010 | Parsons | G06Q 30/02 707/748 |
| 2004/0225509 A1* | 11/2004 | Andre | G06Q 30/02 705/26.7 |
| 2005/0278322 A1* | 12/2005 | Fan | G06N 99/005 |
| 2006/0106665 A1* | 5/2006 | Kumar | G06Q 10/06393 705/7.29 |
| 2006/0235783 A1 | 10/2006 | Ryles et al. | |
| 2007/0260563 A1* | 11/2007 | Fan | G06N 99/005 706/12 |
| 2008/0294617 A1* | 11/2008 | Chakrabarti | G06F 17/30867 |
| 2008/0300973 A1* | 12/2008 | DeWitt | G06Q 10/08 705/14.21 |

(Continued)

Primary Examiner — Saba Dagnew
(74) Attorney, Agent, or Firm — Alston & Bird LLP

(57) ABSTRACT

A method, apparatus, and computer program product are disclosed for improved promotion targeting. An example apparatus includes a processor configured to cause retrieval of historical information regarding transactions associated with a plurality of identifier entities. The example apparatus further includes modeling circuitry configured to train a statistical model using the retrieved historical information, and estimate, using the statistical model, values for expected identifier entity transaction requests associated with each of the plurality of identifier entities. The processor of the example apparatus may further be configured to select, based on the estimated values, a subset of identifier entities to receive impressions of the promotion, and the apparatus may further include communications circuitry configured to transmit an impression of the promotion to each identifier entity in the subset.

18 Claims, 11 Drawing Sheets

(56) References Cited

U.S. PATENT DOCUMENTS

| | | | |
|---|---|---|---|
| 2009/0132347 A1 | 5/2009 | Anderson et al. | |
| 2009/0281884 A1 | 11/2009 | Selinger et al. | |
| 2009/0281895 A1* | 11/2009 | Selinger | G06Q 30/02 |
| | | | 705/14.43 |
| 2010/0169252 A1* | 7/2010 | Fan | G06N 99/005 |
| | | | 706/13 |
| 2014/0100947 A1 | 4/2014 | Kitts et al. | |

* cited by examiner

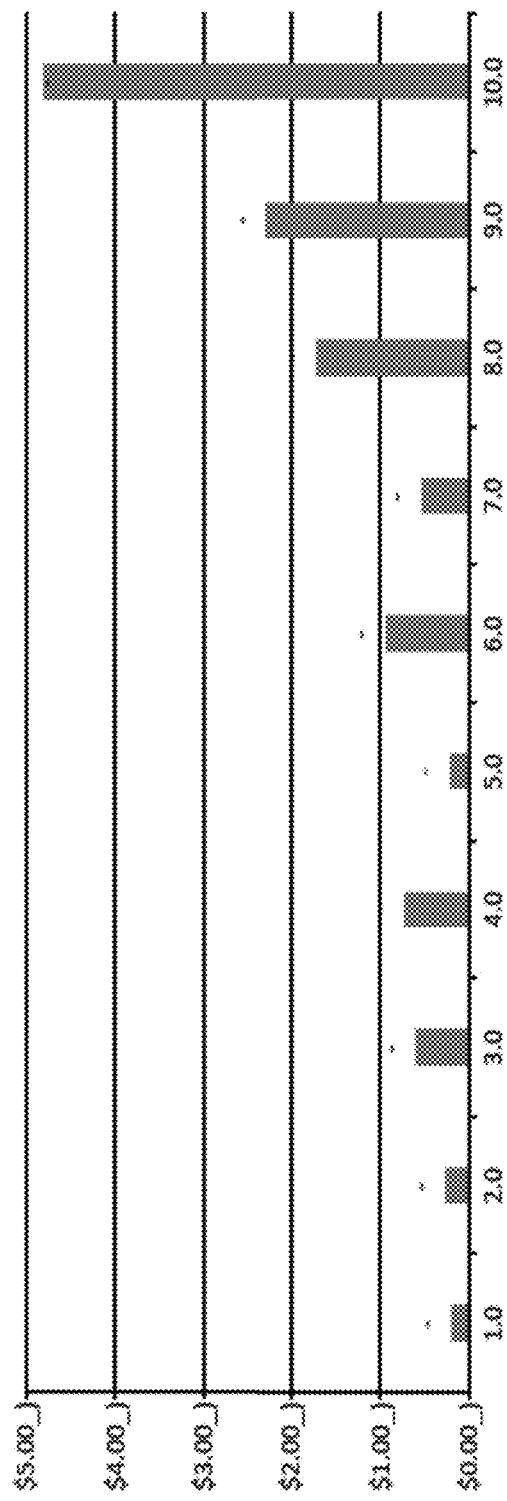
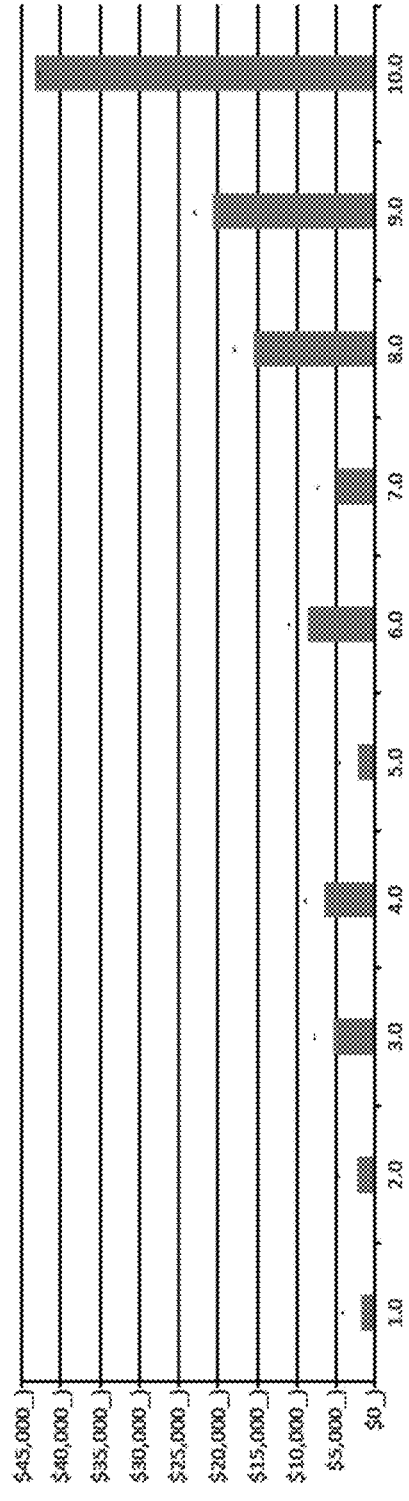
FIG. 6A
FIG. 6B

FIG. 8A

| clusters | preferential pricing discounts | existing system discounts | CPdisc/ existing system (per discount) | CPdisc/ (per discount) |
|---|---|---|---|---|
| 0 1-10 | 7.6% | $39,970 | $3.01 | $0.40 |
| 1 1-10 | 4.1% | $0 | $1.78 | $0.42 |
| 0 7-10 | 13.1% | $28,130 | $5.41 | $0.72 |
| 1 7-10 | 6.8% | $0 | $3.07 | $0.71 |
| 0 8-10 | 14.8% | $23,970 | $6.21 | $0.82 |
| 1 8-10 | 7.4% | $0 | $3.28 | $0.76 |

FIG. 8B

| clusters | Incremental GP (incl. discount) | ROI |
|---|---|---|
| 1-10 | $110,476 | ($1,275) -3% |
| 7-10 | $84,047 | $559 2% |
| 8-10 | $79,168 | $1,610 7% |

| | | | |
|---|---|---|---|
| ALL | $1.23 | -$0.02 | $0.45 |
| top 40 % | $2.34 | $0.01 | $0.78 |
| top 30 % | $2.93 | $0.06 | $0.89 |

FIG. 9A

| | | | | | |
|---|---|---|---|---|---|
| ALL | 7200000 | $3,205,793 | $8,856,000 | -$144,000 | -4.5% |
| top 40 % | 2880000 | $2,250,525 | $6,739,200 | $28,800 | 1.3% |
| top 30 % | 2160000 | $1,916,748 | $6,328,800 | $129,600 | 6.8% |

FIG. 9B

APPARATUS AND METHOD FOR ENHANCED MESSAGE TARGETING

CROSS REFERENCE TO RELATED APPLICATIONS

This application claims the benefit of U.S. Provisional Patent Application No. 62/140,025 and U.S. Provisional Patent Application No. 62/140,030, each titled "Apparatus and Method for Enhanced Message Targeting," each filed Mar. 30, 2015, and each incorporated by reference herein in its entirety.

TECHNOLOGICAL FIELD

Example embodiments of the present invention relate generally to machine learning based on statistical modeling and, more particularly, to an apparatus and method for predictively modeling user behavior for targeting marketing incentives to users.

BACKGROUND

Applicants have discovered problems with existing mechanisms for targeting correspondence using programmatic electronic systems. Through applied effort, ingenuity, and innovation, Applicants have solved many of these identified problems by developing a solution that is embodied by the present invention and described in detail below.

BRIEF SUMMARY

A novel system is provided for targeting marketing messages to users. For example, machine learning techniques may be used to train a statistical model for user behavior prediction and optimization of messaging functions. Advantageously, the capability of the underlying machine learning systems are therefore improved. By selectively generating and sending messages in accordance with the output of the trained statistical model, improvements to the efficient use of computing resources are achieved in terms of processing, networking, and data storage. Furthermore, promotion and marketing systems may serve numerous users or consumers, tracking consumer interactions with these electronic systems (e.g., over a network such as the Internet). The large volumes of consumer data collected by these systems make manual analysis inefficient and effectively unworkable. Thus the techniques discussed herein also provide for programmatic "big data" handling of collected user data.

Furthermore, example embodiments described herein are designed to maximize revenue received in response to customer relationship campaigns run by a promotion and marketing service by carefully choosing consumers to whom different promotions are offered. The procedures for choosing which promotions to offer to which consumers are based on an architecture that models consumer behavior using a wide variety of factors and predicts an incremental booking value for a particular promotion and a particular consumer. The factors used to develop the model may comprise electronic marketing information, which may include information regarding consumer purchase history, consumer activity (e.g., clickstream data), location data, demographic information, or the like. By modeling consumer behavior and predicting expected incremental booking values of a consumer population, example embodiments facilitate the delivery of promotions to a subset of the consumer population that maximize merchants' expected revenues.

In a first example embodiment, an apparatus is provided for improved machine learning using a statistical model to facilitate improved targeting of a promotion. The apparatus includes a processor configured to cause retrieval of historical information regarding transactions associated with a plurality of identifier entities, wherein the historical information includes, for each identifier entity, a number of purchases associated with the identifier entity within a predetermined period of time; a number of purchases associated with the identifier entity through a promotion and marketing service; click indications regarding a number of impressions associated with the identifier entity; a total revenue associated with the identifier entity over all promotions; registration information associated with the identifier entity; email receipt indications regarding a number of email impressions associated with the identifier entity; and impression receipt indications associated with the identifier entity. The apparatus also includes modeling circuitry configured to train the statistical model using the retrieved historical information, and estimate, using the statistical model, values for expected identifier entity transaction requests associated with each of the plurality of identifier entities. In some embodiments, the apparatus further includes a processor configured to select, based on the estimated values, a subset of identifier entities to receive impressions of the promotion.

In some embodiments, the processor is configured to select the subset by ranking the plurality of consumers by incremental booking values associated with the promotion that correspond to each of the plurality of consumers, and selecting a predetermined percentage of highest ranked consumers, wherein the subset of the plurality of consumers to target comprises the predetermined percentage of highest ranked consumers.

In some embodiments, selection of the subset of the plurality of consumers maximizes expected revenue generated by the promotion.

In some embodiments, the apparatus further includes communications circuitry configured to transmit an impression of the promotion to each identifier entity in the subset.

In some embodiments, the processor is configured to cause the retrieval of the historical information from at least one of the plurality of identifier entities, one or more merchants, or a memory. In this regard, in some embodiments, the retrieved historical information further includes, for each identifier entity, at least one of: a number of promotions purchased by the identifier entity within three zip codes of a given location within a predetermined period of time; an average cost of transactions associated with the identifier entity; a number of active channel subscriptions associated with the identifier entity; a total number of bookings associated with the identifier entity; a highest price of a promotion purchased from a promotion and marketing service that is associated with the identifier entity; impression receipt indications regarding a number of promotions in a predetermined price range associated with the identifier entity; and a median price of bookings associated with the identifier entity.

In some embodiments, the statistical model comprises an ensemble learning model. In some such embodiments, the ensemble learning model comprises a gradient boosted regression model.

In another example embodiment, a method is provided for improved machine learning using a statistical model to facilitate improved targeting of a promotion. The method includes retrieving historical information regarding transactions associated with a plurality of identifier entities, wherein the historical information includes, for each identifier entity, a number of purchases associated with the identifier entity within a predetermined period of time; a number of purchases associated with the identifier entity through a promotion and marketing service; click indications regarding a number of impressions associated with the identifier entity; a total revenue associated with the identifier entity over all promotions; registration information associated with the identifier entity; email receipt indications regarding a number of email impressions associated with the identifier entity; and impression receipt indications associated with the identifier entity. The method further includes training, by modeling circuitry, the statistical model using the retrieved historical information, and estimating, by the modeling circuitry and using the statistical model, values for expected identifier entity transaction requests associated with each of the plurality of identifier entities. In some embodiments, the method includes selecting, by a processor and based on the estimated values, a subset of identifier entities to receive impressions of the promotion.

In some embodiments, selecting the subset of the devices includes ranking the plurality of identifier entities, and selecting a predetermined percentage of highest ranked identifier entities, wherein the subset of identifier entities to target comprises the predetermined percentage of highest ranked identifier entities.

In some embodiments, selecting the subset of identifier entities maximizes expected revenue generated by the promotion.

In some embodiments, the method further includes transmitting, by communications circuitry, an impression of the promotion to each identifier entity in the subset.

In some embodiments, retrieving historical information regarding the transactions made by the plurality of identifier entities comprises retrieving the historical information from at least one of the plurality of identifier entities, one or more merchants, or a memory. In this regard, in some embodiments. the retrieved historical information further includes, for each identifier entity, at least one of: a number of promotions purchased by the identifier entity within three zip codes of a given location within a predetermined period of time; an average cost of transactions associated with the identifier entity; a number of active channel subscriptions associated with the identifier entity; a total number of bookings associated with the identifier entity; a highest price of a promotion purchased from a promotion and marketing service that is associated with the identifier entity; impression receipt indications regarding a number of promotions in a predetermined price range associated with the identifier entity; and a median price of bookings associated with the identifier entity.

In some embodiments, the statistical model comprises an ensemble learning model. In some such embodiments, the ensemble learning model comprises a gradient boosted regression model.

In another example embodiment, an apparatus is provided for improved machine learning using a statistical model to facilitate improved targeting of a promotion. The apparatus includes means for retrieving historical information regarding transactions associated with a plurality of identifier entities, wherein the historical information includes, for each identifier entity, a number of purchases associated with the identifier entity within a predetermined period of time; a number of purchases associated with the identifier entity through a promotion and marketing service; click indications regarding a number of impressions associated with the identifier entity; a total revenue associated with the identifier entity over all promotions; registration information associated with the identifier entity; email receipt indications regarding a number of email impressions associated with the identifier entity; and impression receipt indications associated with the identifier entity. The apparatus further includes means for training the statistical model using the retrieved historical information, and means for estimating, using the statistical model, values for expected identifier entity transaction requests associated with each of the plurality of identifier entities. In some embodiments, the apparatus further includes means for selecting, based on the estimated values, a subset of identifier entities to receive impressions of the promotion.

In some embodiments, the means for selecting the subset of the devices includes means for ranking the plurality of identifier entities, and means for selecting a predetermined percentage of highest ranked identifier entities, wherein the subset of identifier entities to target comprises the predetermined percentage of highest ranked identifier entities.

In some embodiments, the means for selecting the subset of identifier entities comprise means for selecting the subset of identifier entities to maximize expected revenue generated by the promotion.

In some embodiments, the apparatus further includes means for transmitting an impression of the promotion to each identifier entity in the subset.

In some embodiments, the means for retrieving historical information regarding the transactions made by the plurality of identifier entities comprises means for retrieving the historical information from at least one of the plurality of identifier entities, one or more merchants, or a memory. In this regard, in some embodiments the retrieved historical information further includes, for each identifier entity, at least one of: a number of promotions purchased by the identifier entity within three zip codes of a given location within a predetermined period of time; an average cost of transactions associated with the identifier entity; a number of active channel subscriptions associated with the identifier entity; a total number of bookings associated with the identifier entity; a highest price of a promotion purchased from a promotion and marketing service that is associated with the identifier entity; impression receipt indications regarding a number of promotions in a predetermined price range associated with the identifier entity; and a median price of bookings associated with the identifier entity.

In some embodiments, the statistical model comprises an ensemble learning model. In some such embodiments, the ensemble learning model comprises a gradient boosted regression model.

In yet another example embodiment, a computer program product is provided for improved machine learning using a statistical model to facilitate improved targeting of a promotion. The computer program product includes a memory storing computer program instructions that, when executed, cause an apparatus to retrieve information regarding a plurality of consumers, train the statistical model of the plurality of consumers based on the retrieved information, predict, using the statistical model, an incremental booking value associated with the promotion for each consumer of the plurality of consumers, and select a subset of the plurality of consumers for receiving impressions of the promotion. The computer program instruction may further be configured to, when executed, cause the apparatus to transmit an impression of the promotion to each consumer in the subset of the plurality of consumers.

In yet another example embodiment, a computer program product is provided is provided for improved machine learning using a statistical model to facilitate improved targeting of a promotion. The computer program product includes a memory storing computer program instructions that, when executed, cause an apparatus to retrieve historical information regarding transactions associated with a plurality of identifier entities, wherein the historical information includes, for each identifier entity, a number of purchases associated with the identifier entity within a predetermined period of time; a number of purchases associated with the identifier entity through a promotion and marketing service; click indications regarding a number of impressions associated with the identifier entity; a total revenue associated with the identifier entity over all promotions; registration information associated with the identifier entity; email receipt indications regarding a number of email impressions associated with the identifier entity; and impression receipt indications associated with the identifier entity. The computer program instruction are further configured to, when executed, cause the apparatus to train the statistical model using the retrieved historical information, and estimate, using the statistical model, values for expected identifier entity transaction requests associated with each of the plurality of identifier entities. In some embodiments, the computer program instruction may further be configured to, when executed, cause the apparatus to select, based on the estimated values, a subset of identifier entities to receive impressions of the promotion.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
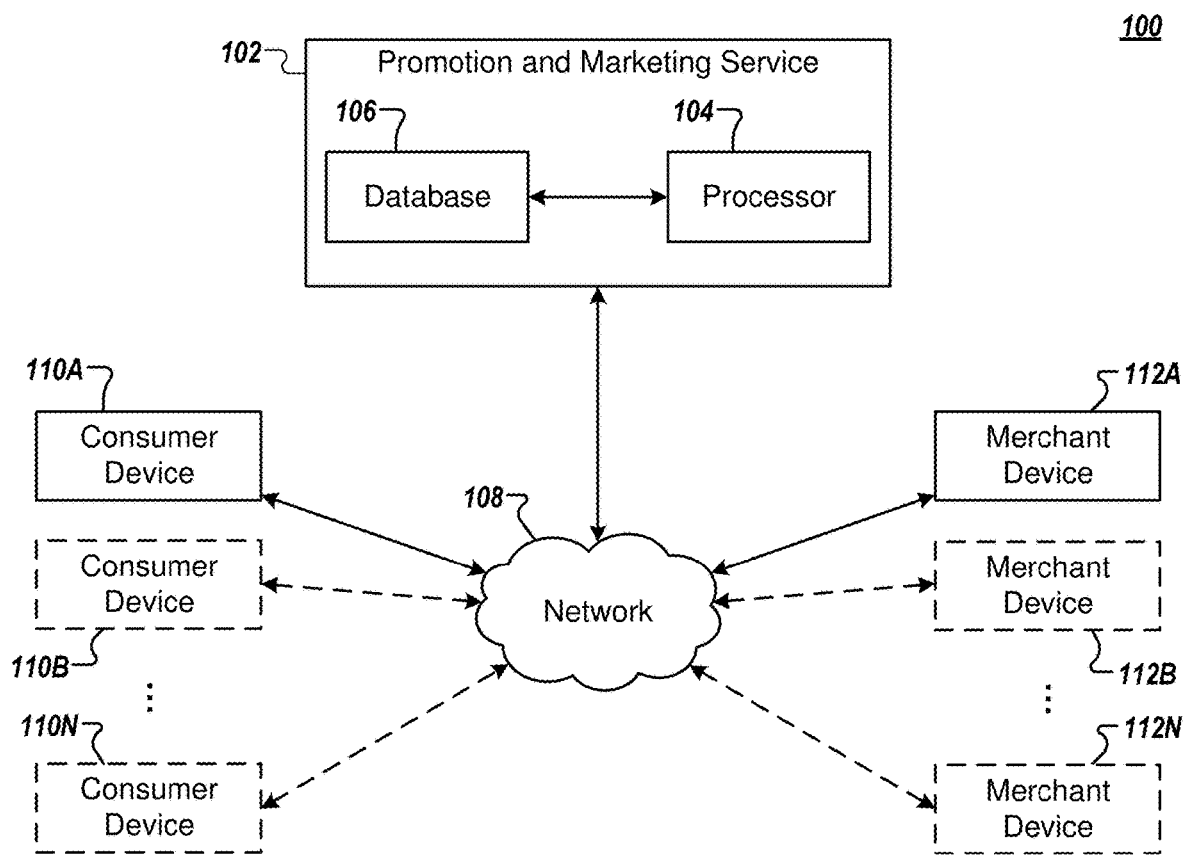
Figure 2:
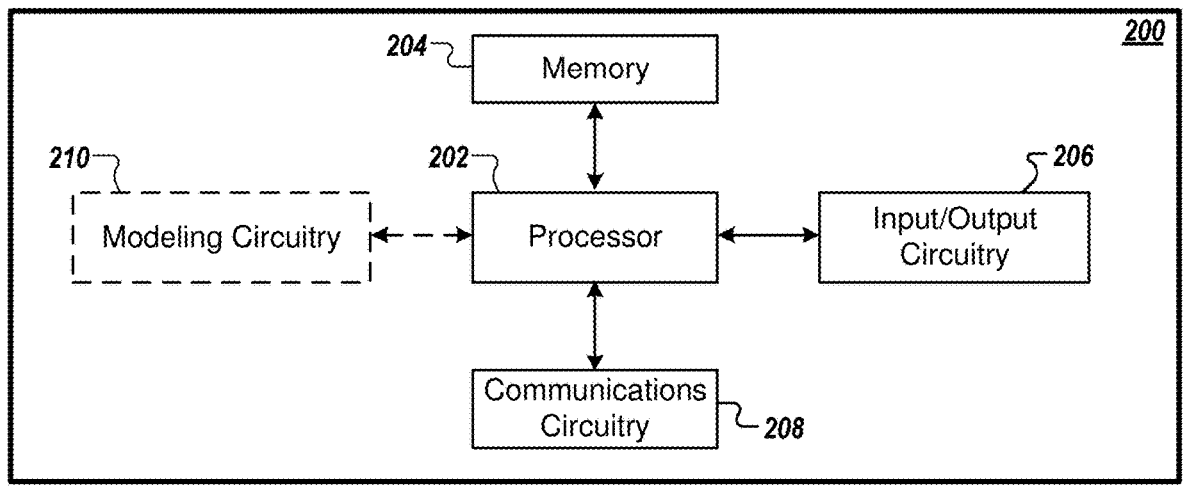
Figure 3:
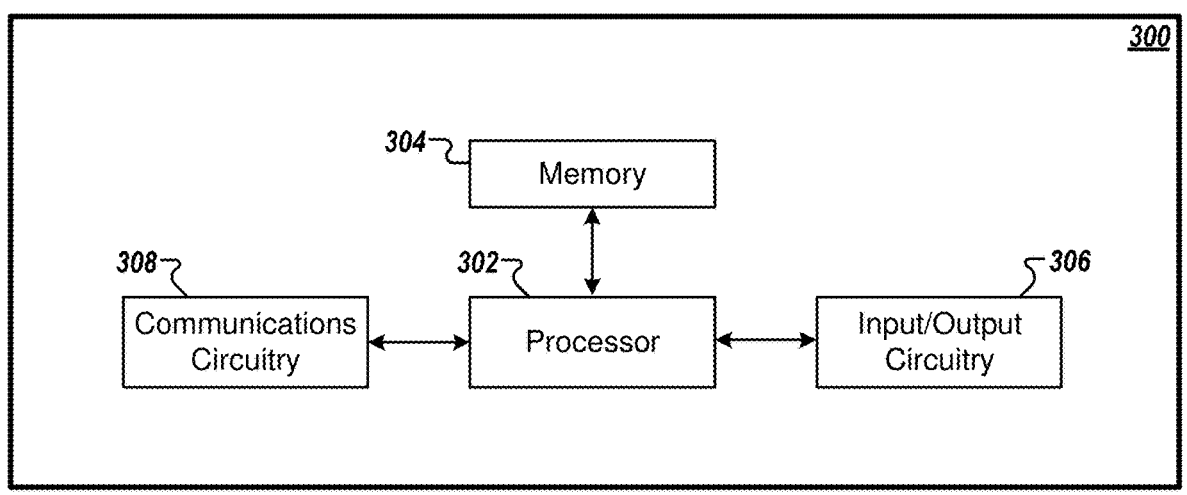
Figure 4:
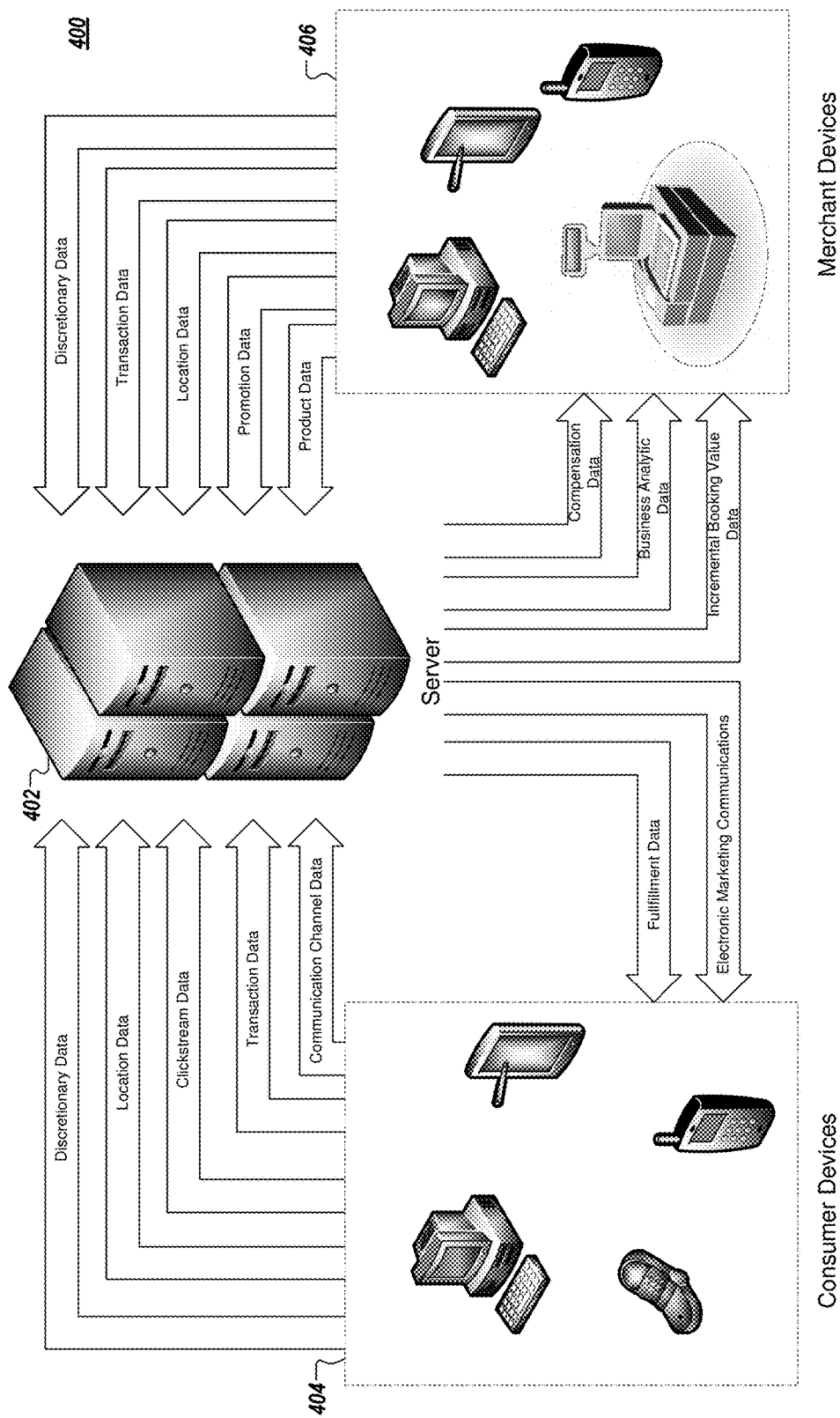
Figure 5:
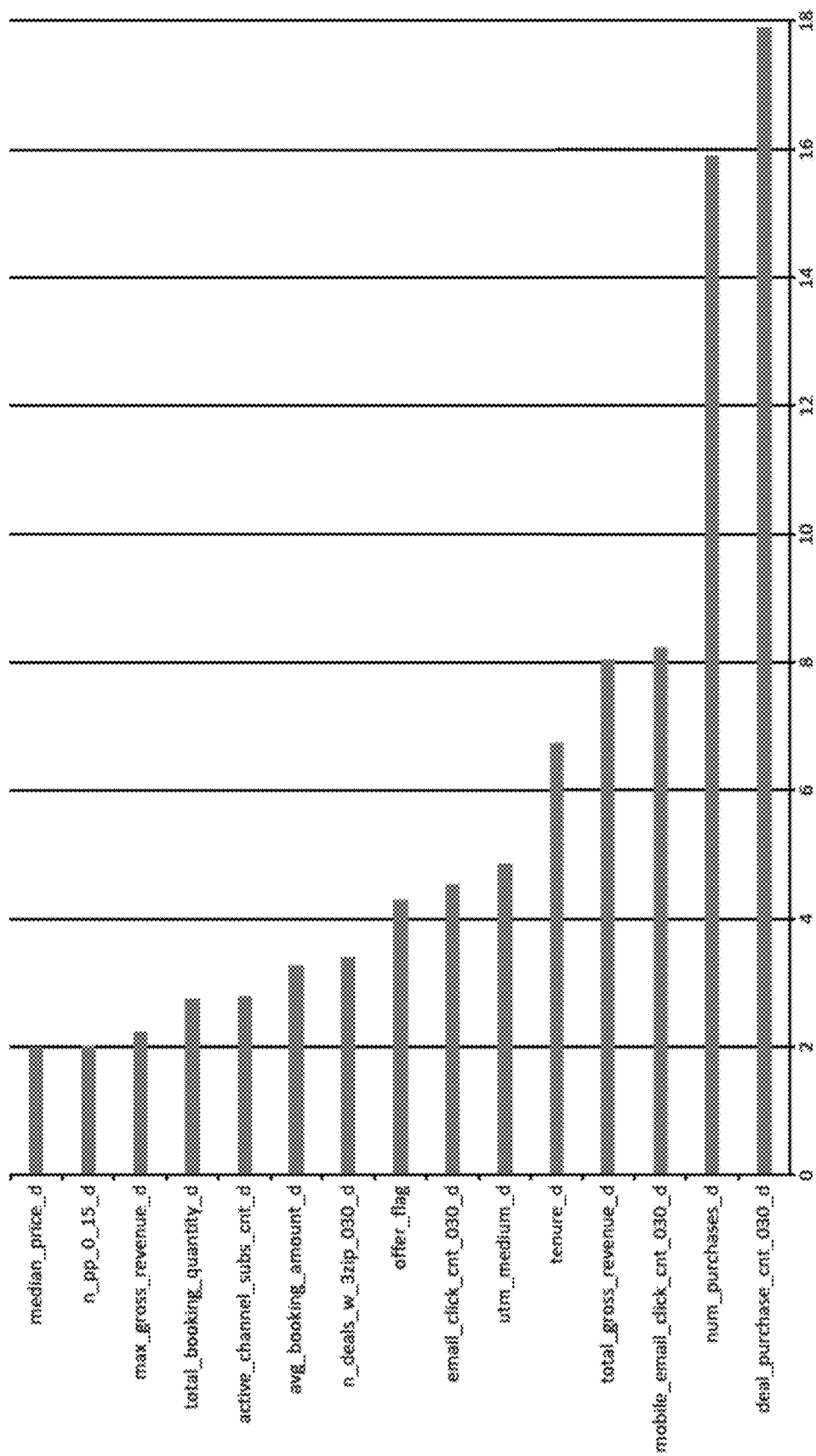
Figure 7A:
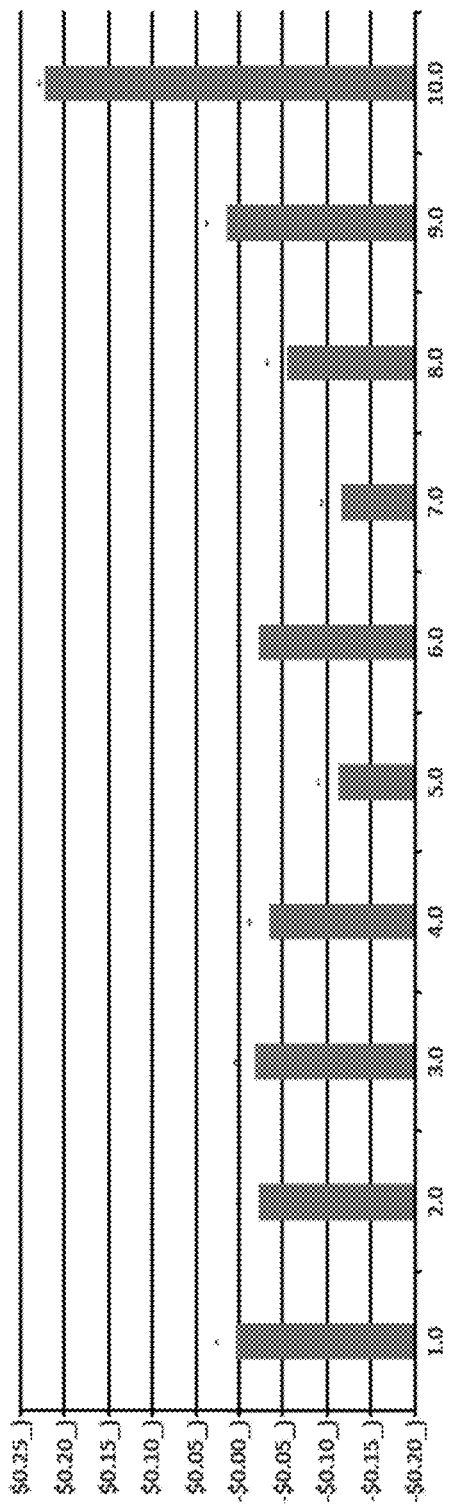
Figure 7B:
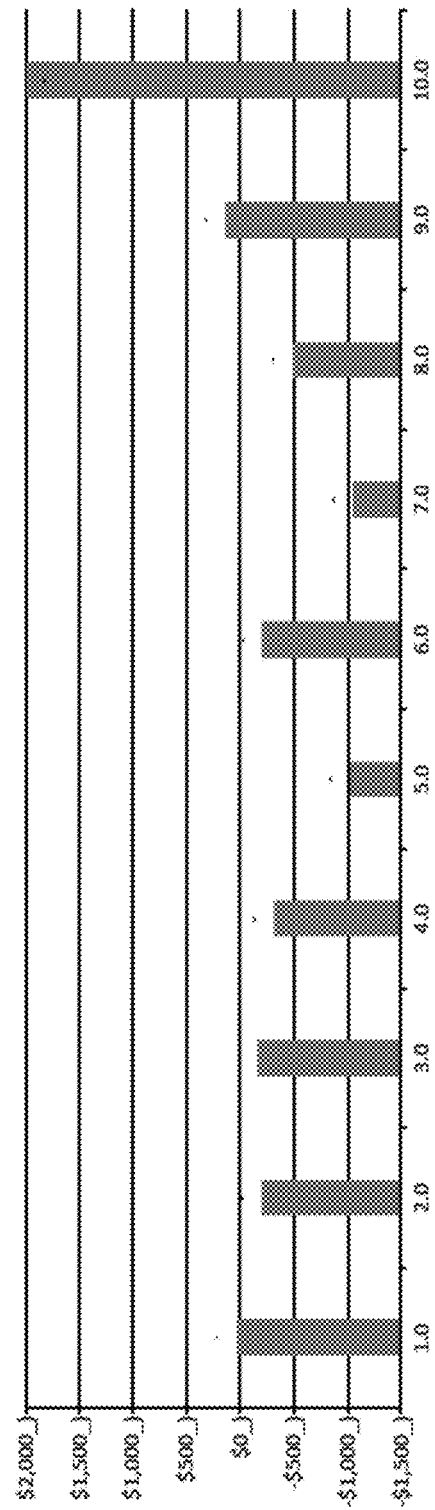
Figure 10A:
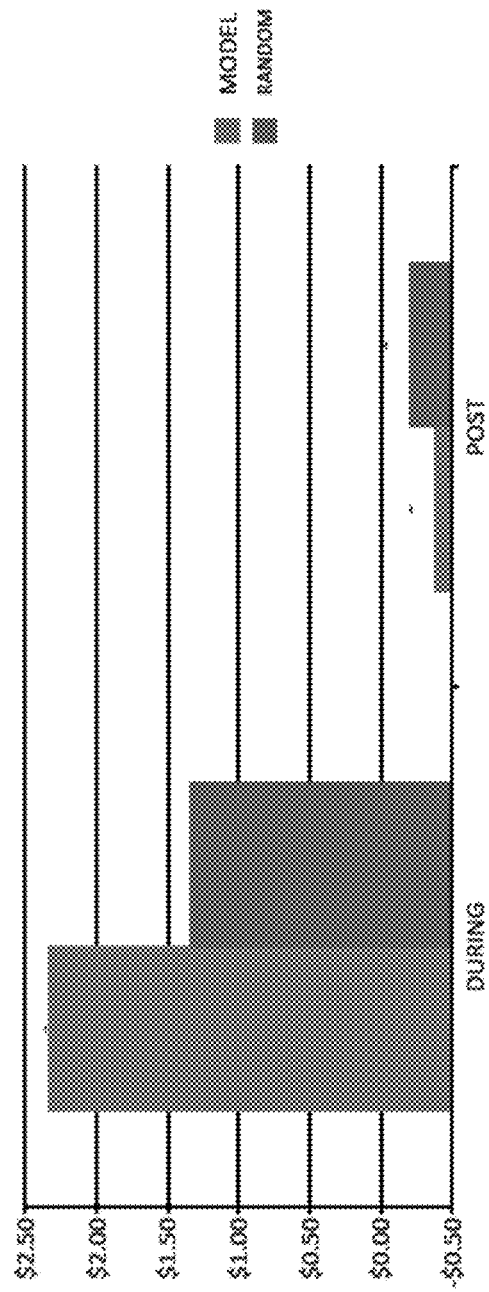
Figure 10B:
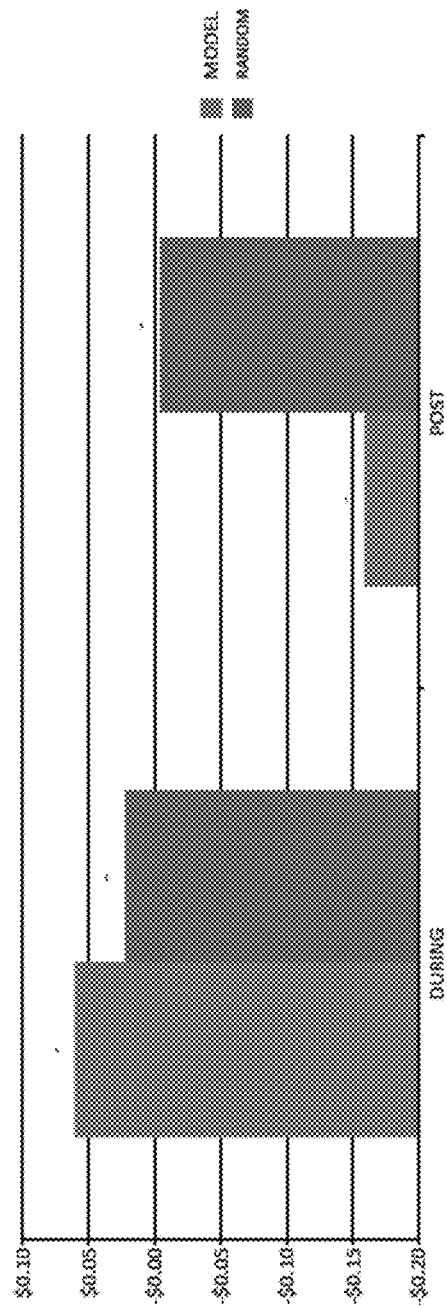
Figure 11:
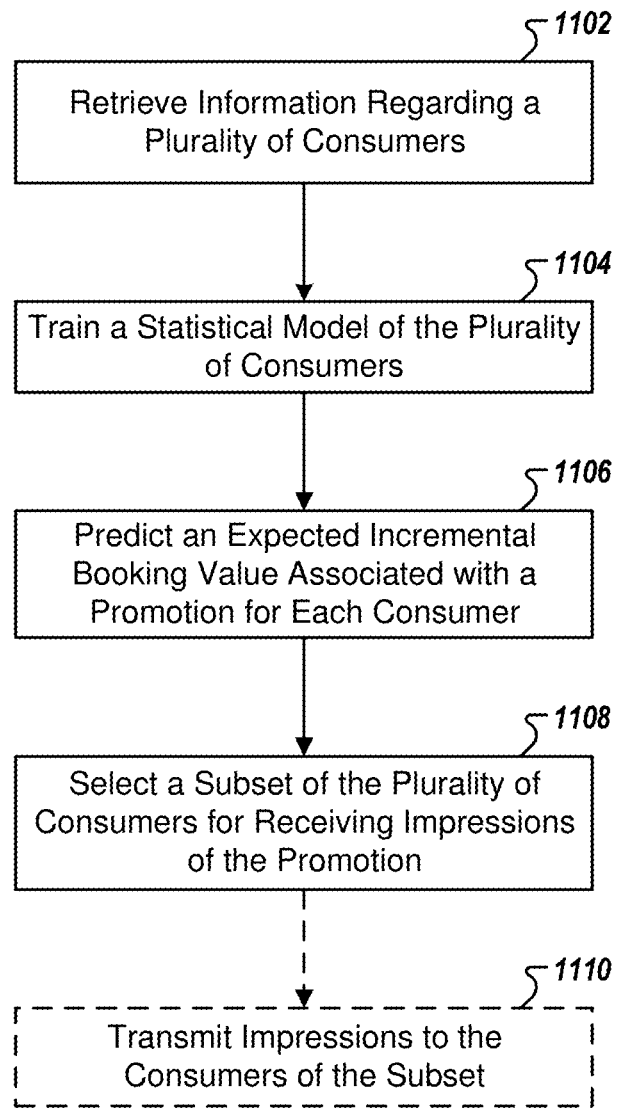
Figures 12, 13:
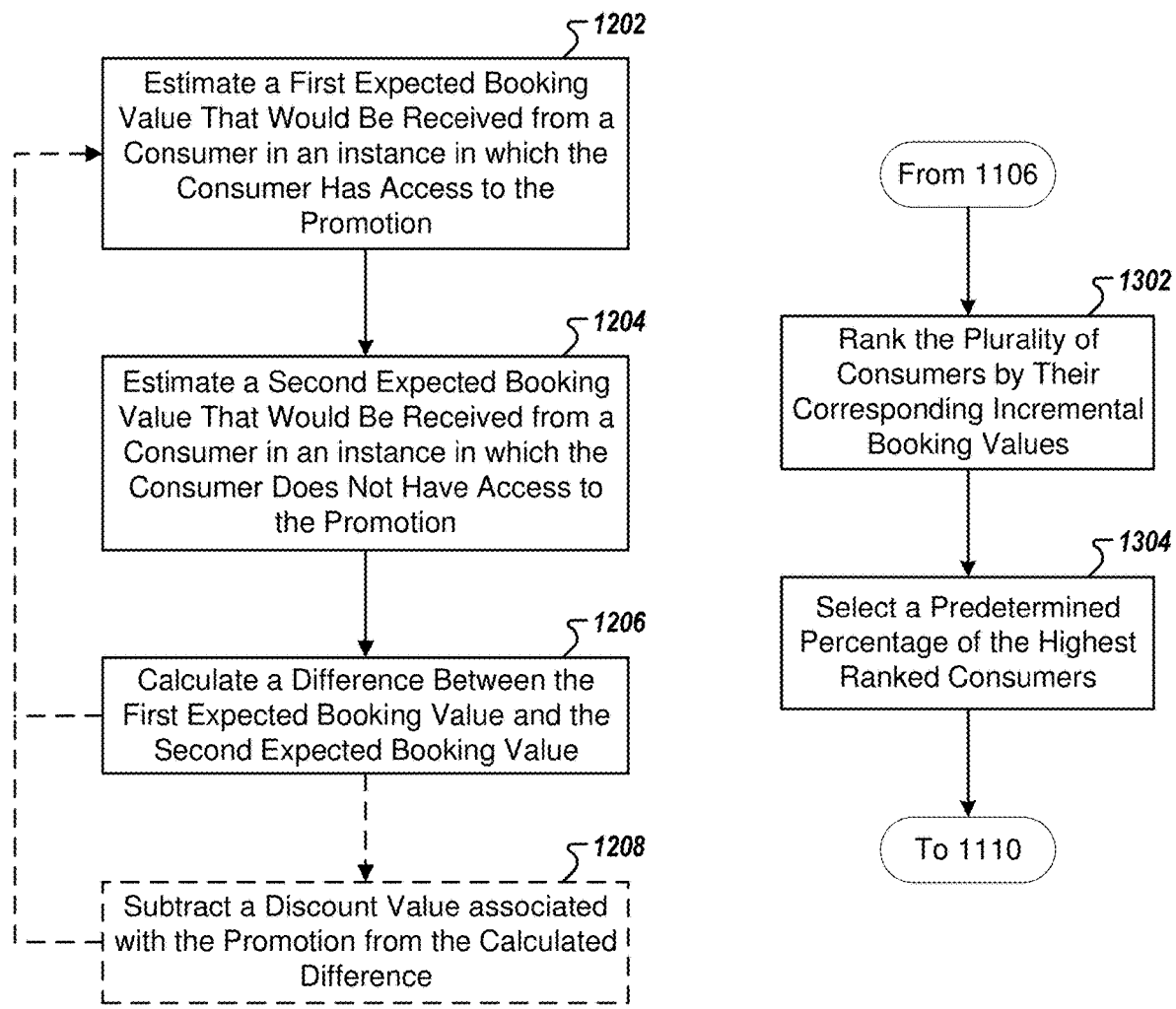

Having thus described certain example embodiments of the present disclosure in general terms, reference will now be made to the accompanying drawings, which are not necessarily drawn to scale, and wherein:

FIG. 1 shows an example system diagram, in accordance with an example embodiment of the present invention;

FIG. 2 illustrates a schematic block diagram of circuitry embodying a promotion and marketing service, in accordance with some example embodiments;

FIG. 3 illustrates a schematic block diagram of circuitry embodying a consumer device or a merchant device, in accordance with some example embodiments;

FIG. 4 illustrates an example data flow diagram illustrating interactions between a promotion and marketing service, one or more consumer devices, and one or more merchant devices, in accordance with some example embodiments;

FIG. 5 illustrates a graph showing magnitudes of relative impact of a series of electronic marketing information, in accordance with some example embodiments;

FIGS. 6A and 6B illustrate incremental booking values in graph form plotted against different fractions of a rank-ordered consumer population, in accordance with some example embodiments;

FIGS. 7A and 7B illustrate the same fractions of a rank-ordered consumer population graphed against the Contribution to Profit ("CP") of a promotion, in accordance with some example embodiments;

FIGS. 8A and 8B illustrate the monetary impact of offering promotions to different segments of a consumer population, in accordance with some example embodiments;

FIGS. 9A and 9B illustrate diagrams that show the projected impact of offering promotions to different segments of a consumer population, in accordance with some example embodiments;

FIGS. 10A and 10B illustrate the differential impact on incremental booking and CP, respectively, of offering a promotion to a top fraction of consumers in a population and offering the same promotion to a random fraction of the consumer population, in accordance with some example embodiments;

FIG. 11 illustrates a flowchart describing example operations for enhancing the expected revenue derived from a particular promotional offering, in accordance with some example embodiments;

FIG. 12 illustrates a flowchart describing example operations for estimating incremental booking values associated with a promotion for a consumer, in accordance with some example embodiments; and FIG. 13 illustrates a flowchart describing example operations for selecting consumers to receive impressions of a promotion, in accordance with some example embodiments.

DETAILED DESCRIPTION

Overview

Businesses of all types continue to search for ways to increase revenue and profit. For promotion and marketing services, a basic goal is to identify promotions that are attractive to consumers. In many cases, however, such promotions offer products or services for which consumers have a preexisting interest. Put another way, while attractive promotions may amplify consumer interest and likelihood of purchase, some consumers will demonstrate a degree of interest that would lead to a purchase even without promotions.

The implication of this fact is that while providing promotions can increase sales volume, marketing promotions also carries with it a cost in the form of consumers who redeem promotions, but who would otherwise have made similar purchases. As a result, delivering promotions that are attractive to consumers can, in some situations, actually lead to a reduction in organic revenues or profit.

A promotion and marketing service that can differentiate between those consumers who require a promotion to prompt a purchase and those who do not provides a powerful value proposition to merchants. This differentiation would enable merchants that offer many items at a variety of prices to increase revenue by selectively targeting promotions to only some users and some items.

Considering the factors above, example embodiments described herein are designed to maximize revenue received in response to customer relationship campaigns run by a promotion and marketing service by carefully choosing consumers to whom different promotions are offered. The procedures for choosing which promotions to offer to which consumers are based on an architecture that models consumer behavior using a wide variety of factors and predicts an expected incremental booking value for a particular promotion and a particular consumer. The factors used to develop the model may comprise electronic marketing information, which may include information regarding consumer purchase history, consumer activity (e.g., clickstream data), location data, demographic information, or the like. By modeling consumer behavior and predicting expected incremental booking values of a consumer population, example embodiments facilitate the delivery of promotions to a subset of the consumer population that maximize merchants' expected revenues.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "vendor," "provider," and "merchant" may be used interchangeably and may include, but are not limited to, a business owner, consigner, shopkeeper, tradesperson, operator, entrepreneur, agent, dealer, organization or the like that is in the business of a providing a good, service or experience to a consumer, facilitating the provision of a good, service or experience to a consumer and/or otherwise operating in the stream of commerce. The "vendor," "provider," or "merchant" need not actually market a product or service via the promotion and marketing service, and may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to the subset of types of electronic data and signals that may be interpreted by a promotion and marketing service to provide improved electronic marketing communications. Electronic marketing information may include, without limitation, clickstream data (defined below), transaction data (defined below), location data (defined below), context information (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service (GPS) receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process.

Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service or a merchant and to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication.

However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

It should be appreciated that the term "incremental booking value" is intended to refer to the difference between the revenue generated by a consumer who is offered a promotion during a particular time period and the revenue generated by the consumer when not offered the promotion during the particular time period. For example, during a promotion campaign, if a consumer would redeem goods, services and/or experiences worth $30 when provided with a particular promotion that offers a discount of $10, but would only purchases goods, services and/or experiences worth $15 when not provided with the particular promotion, the consumer's incremental booking value for the particular promotion is the difference in revenue generated between the two scenarios. The first scenario generates revenue of $30 at a cost of $10, for a total revenue generation of $20. The second scenario generates revenue of $15 with no cost. Accordingly, the incremental booking value for the consumer for the particular promotion is $5 ($30-$15-$10).

It should be understood that the incremental booking values of a population may be modeled using electronic marketing information. In this regard, a model can be trained, using electronic marketing information, to predict a consumer's expected incremental booking value for promotions that will be offered in the future. While the actual incremental booking value of any particular consumer cannot be calculated (each consumer either utilizes a promotion or does not utilize a promotion, so a single consumer never does both in a particular time period). However, the incremental booking value for a particular consumer can be estimated based on a comparison of the particular consumer's own behavior and the behavior of similar consumers (all of which may be captured as electronic marketing information).

It should be appreciated that the term "identifier entity" is intended to refer to a consumer profile. A database of identifier entities may be generated and created by the promotion and marketing service or, in some embodiments, by individual merchants. In either case, an identifier entity represents a specific consumer and is associated with one or more consumer devices (e.g., a smartphone, one or more desktop devices, such as a work computer and a home computer, and/or the like) used by the consumer to access the promotion and marketing service (or merchant).

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this and other types of data (collectively, electronic marketing information, defined above) for the benefit of both merchants and consumers. Promotion and marketing services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), the ability of a promotion and marketing services to capture electronic marketing information offers a wealth of additional electronic solutions to improve the experience for consumers and merchants. For instance, the ability to closely monitor user impressions enables the promotion and marketing service to gather data related to the time, place, and manner in which the consumer engaged with the impression (e.g., viewed, clicked, moused-over) and obtained and redeemed the corresponding promotion. The promotion and marketing service may use this information to determine which products and services are most relevant to the consumer's interest, and to provide marketing materials related to said products and services to the consumer, thus improving the quality of the electronic marketing communications received by the consumer.

Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution provide additional layers of electronic marketing information not before seen in traditional print or television broadcast marketing.

However, the offerings of modern promotion and marketing services are not without problems. Although electronic marketing information provides a wealth of information, the inventors have determined that existing techniques may not always leverage this information in an efficient or accurate manner. Technology continues to rapidly advance in the field of electronic commerce, and as a result electronic marketing services continue to provide new and improved methods for engaging with consumers and offering promotions. In many cases, the inventors have determined that these offerings are constrained by technological obstacles unique to the electronic nature of the services provided.

For instance, due to the increasing ease with which consumers can access promotions offered by electronic marketing services, consumers are increasingly able to utilize promotions for products that they would have purchased anyway. In such situations, an electronic marketing service is, in some sense, performing a disservice to merchants, as revenue from willing purchasers is foregone in favor of promotional discounts that the willing purchasers would likely not have availed themselves of prior to the ubiquity of online promotion offerings.

The inventors have determined that even technological methods that leverage computers for statistical analysis and consumer behavior modeling (e.g., television rating systems) fail to address problems associated with providing electronic marketing communications (e.g., impressions) to consumers in a manner that provides for efficient allocation of resources. However, by collecting greater amounts of electronic marketing information, the inventors have determined that increased consumer modeling can increase the efficiency of offering promotions. Example embodiments described herein serve to address these and other deficiencies by offering utilizing electronic marketing information to enhance promotion targeting efforts in a way that would be unavailable without the quality and breadth of electronic data made available by the electronic nature of the service data flow (described below).

Accordingly, various example embodiments provide systems that model historical consumer behavior and predict expected incremental booking values of various promotions for various consumers. Such embodiments thus avoid hurdles imposed by the proliferation of promotions to consumers who would otherwise purchase goods, services or experiences anyway. Example embodiments described herein thus improve revenue generating potential of promotions offered by a promotion and marketing service, and in turn improve the value proposition offered by the promotion and marketing service.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more consumer or merchant devices. The computing device may include one or more fixed computing devices, such as personal computers or computer workstations. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Consumers and merchants may access a promotion and marketing service 102 via a network 108 (e.g., the Internet, or the like) using consumer devices 110A through 110N and merchant devices 112A through 112N, respectively. While it is expected that at least one consumer and at least one merchant interact in the example computing system 100, varying embodiments contemplate any number of consumers and merchants interacting in the system via corresponding consumer terminals 110 and merchant devices 112.

The promotion and marketing service 102 may comprise a server 104 in communication with a database 106. In this regard, the server 104 may be embodied as a computer or computers as known in the art. The server 104 may collect electronic marketing information from various sources, including but not necessarily limited to the consumer devices 110A through 110N and merchant devices 112A through 112N. For example, the server 104 may be operable to receive and process clickstream data or context information provided by a consumer device 110 and/or other devices. The server 104 may also facilitate e-commerce transactions based on transaction information provided by a consumer device 110 and/or a merchant device 112. The server 104 may facilitate the generation and providing of various electronic communications and marketing materials based on the received electronic marketing information, as will be described in greater detail below.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include user account credentials for merchants, and consumers, data indicating the products and promotions offered by the promotion and marketing service, electronic marketing information (e.g., clickstream data, transaction data, location data, communication channel data, or discretionary data), analytic results, reports, financial data, and/or the like. As it relates to the example embodiments described herein the database 106 may store a model developed by the promotion and marketing service 102 to predict the expected booking value of various promotions for various consumers.

Each consumer device 110 may be embodied by any computing device known in the art. Information received by the server 104 from the consumer device 110 may be provided in various forms and via various methods. For example, the consumer device 110 may include laptop computers, smartphones, netbooks, tablet computers, wearable devices, or the like. The information may be provided through various sources on these consumer devices.

In embodiments where a consumer device 110 is a mobile device, such as a smart phone or tablet, the mobile device may execute an "app" to interact with the promotion and marketing service 102 and/or the merchant devices 112A through 112N. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

In the case of a consumer device 110, the promotion and marketing 102 may leverage the application framework offered by the mobile operating system to allow consumers to designate which information is harvested by the app and which may then be provided to the promotion and marketing 102. In some embodiments, consumers may "opt in" to provide particular different types of contextual data in exchange for a benefit, such as improved relevance of marketing communications offered to the consumer. In some embodiments, the consumer may be provided with privacy information and other terms and conditions related to the electronic marketing information harvested by the consumer device 110 and provided to the promotion and marketing 102 during installation or use of the app. Once the consumer provides access to a particular feature of the consumer device 110, information derived from that feature may in some embodiments be provided to the promotion and marketing 102 to improve the quality of the consumer's interactions with the promotion and marketing 102 and/or merchant devices 112A through 112N.

For example, the consumer may indicate a desire to provide location information to the app from location services circuitry included in their mobile device. Providing this information to the promotion and marketing 102 may enable the promotion and marketing 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing 102. For example, the consumer may decide at a later point to disable the ability of the app to access the location services circuitry, thus limiting the access of the consumer's location information to the backend server 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service 102 through leveraging the functionality offered by the various mobile operating systems.

Additionally or alternatively, each consumer device 110 may interact with the promotion and marketing 102 or merchant devices 112A through 112N via a web browser. As yet another example, each consumer device 110 may include various hardware or firmware designed to interface with the promotion and marketing 102 or merchant devices 112A through 112N (e.g., where the consumer device 110 is a purpose-built device offered for the primary purpose of communicating with the promotion and marketing service 102).

The merchant devices 112A through 112N may be embodied by any computing device as known in the art and operated by a merchant. For example, the merchant devices 112A through 112N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 112A through 112N may also be provided in various forms and via various methods. For example, the merchant devices 112A through 112N may provide real-time transaction and/or inventory information as purchases are made from the merchant. In other embodiments, the merchant devices 112A through 112N may be employed to provide information to the promotion and marketing service 102 to enable the promotion and marketing service 102 to generate promotions or other marketing information to be provided to consumers.

An example of a data flow for exchanging electronic information among one or more consumer devices 110A through 110N, one or more merchant devices 112A through 112N, and the promotion and marketing service 102 is described below in connection with FIG. 4.

Example Implementing Apparatuses

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208 and modeling circuitry 210. The apparatus 200 may be configured to execute the operations described above with respect to FIG. 1 and below with respect to FIGS. 3 and 11 through 13. Although the descriptions of components 202 through 210 may utilize functional limitations, it should be understood that the particular implementations necessarily include the use of particular hardware. It should also be understood that certain of these components 202 through 210 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display that may include a web user interface, a mobile application, a client device, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Modeling circuitry 210 includes hardware components designed to generate, train, and maintain one or more consumer models and predict an expected incremental booking values associated with various promotions for various consumers. These hardware components may, for instance, utilize communications circuitry 208 to retrieve stored data from database 106 and/or receive electronic marketing information from remote devices (e.g., consumer devices 110, merchant devices 112, or the like). Modeling circuitry 210 may utilize processing circuitry, such as the processor 202, to perform the above operations, and may utilize memory 204 to store the collected information and any generated consumer models. It should also be appreciated that, in some embodiments, the modeling circuitry 210 may include a separate processor, specially configured field programmable gate array (FPGA), or application specific interface circuit (ASIC) to perform the above functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as systems, methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The consumer device(s) 110A through 110N and merchant devices 112A through 112N may be embodied by one or more computing systems, such as apparatus 300 shown in FIG. 3. As illustrated in FIG. 3, the apparatus 300 may include a processor 302, a memory 304, an input/output circuitry 306, and a communications circuitry 308. The apparatus 300 may be configured to execute the operations described above with respect to FIG. 1. The functioning of the processor 302, the memory 304, the input/output circuitry 306, and the communication circuitry 308 may be similar to the similarly named components described above with respect to FIG. 2. For the sake of brevity, additional description of these components is omitted.

Having described specific hardware components of example devices utilized herein, an example of a data flow for exchanging electronic information among one or more consumer devices, merchant devices, and the promotion and marketing service is described below with respect to FIG. 4.

Example Service Data Flow

FIG. 4 depicts an example data flow 400 illustrating interactions between a server 402, one or more consumer devices 404, and one or more merchant devices 406. The server 402 may be implemented in the same or a similar fashion as the server 104 as described above with respect to FIG. 1, the one or more consumer devices 404 may be implemented in the same or a similar fashion as the consumer devices 110A through 110N as described above with respect to FIG. 1, and the one or more merchant devices 406 may be implemented in the same or a similar fashion as the merchant devices 112A through 112N as described above with respect to FIG. 1.

The data flow 400 illustrates how electronic information may be passed among various systems when employing a server 402 in accordance with embodiments of the present invention. The one or more consumer devices 404 and/or one or more merchant devices 406 may provide a variety of electronic marketing information to the server 402 for use in providing promotion and marketing services to the consumer. This electronic marketing information may include, but is not limited to, location data, clickstream data, transaction data, communication channel data, and/or discretionary data.

As a result of transactions performed between the one or more consumer devices 404 and the server 402, the server 402 may provide fulfillment data to the consumer devices 404. The fulfillment data may include information indicating whether the transaction was successful, the location and time the product will be provided to the consumer, instruments for redeeming promotions purchased by the consumer, or the like.

In addition to the e-commerce interactions with the one or more consumer devices 404 offered by the server 402, the server 402 may leverage information provided by the consumer devices 404 to improve the relevancy of marketing communications to individual consumers or groups of consumers. In this manner, the server 402 may determine promotions, goods, and services that are more likely to be of interest to a particular consumer or group of consumers based on the received electronic marketing information. For example, the server 402 may detect the location of a consumer based on location data provided by the consumer device, and offer promotions based on the proximity of the consumer to the merchant associated with those promotions.

It should be appreciated that a variety of different types of electronic marketing information could be provided to the server 402 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 402 may also control other factors of the electronic marketing communications sent to the consumer other than the particular promotions included in the electronic marketing communication. For example, the server 402 may determine the form, structure, frequency, and type of the electronic marketing communication. As with the content of the electronic marketing communication, these factors may be programmatically determined according to various methods, factors, and processes based on electronic data received by the server 402.

The server 402 interactions with the one or more merchant devices 406 may be related to enabling the merchant to market their products using a promotion and marketing service. For example, the one or more merchant devices 406 may provide promotion data defining one or more promotions to be offered by the promotion and marketing service on behalf of the merchant. The server 402 may receive this information and generate information for providing such promotions via an e-commerce interface, making the promotions available for purchase by consumers. The server 402 may also receive information about products from the one or more merchant devices 406. For example, a merchant may provide electronic marketing information indicating particular products, product prices, inventory levels, and the like to be marketed via a promotion and marketing service. The server 402 may receive this information and generate listing information to offer the indicating products to consumers via a promotion and marketing service.

The one or more merchant devices 406 may also receive information from the server 402. For example, in some embodiments a merchant may obtain access to certain business analytic data aggregated, generated, or maintained by the server 402. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 406 may also receive electronic compensation data from the server 402. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Moreover, it should be understood that the server 402 may train a model to predict expected incremental booking values that illustrate the additional value added by offering promotions to consumers. The expected incremental booking values can reveal categories of consumers that should receive each promotion (and those that shouldn't). The expected incremental booking values need not be transmitted by the server 404 to another device, but in some embodiments the incremental booking values may be transmitted to the merchant devices 406 for separate review and/or analysis.

Embodiments advantageously provide for improvements to the server and/or merchant devices by improving the efficiency of promotion delivery. In this regard, by providing a mechanism to carefully deliver impressions only to those consumers for which transmission enhances revenue generation potential, example embodiments increase the potency of promotions offered by the promotion and marketing service.

Incremental Booking Values and Consumer Modeling

Having described the circuitry comprising some example embodiments, it should be understood that a promotion and marketing service 102 may utilize statistical analysis to model historical consumer behavior and predict expected incremental booking values of various promotions for various consumers. These concepts will be discussed in connection with FIGS. 5 through 10B.

As an initial matter, the inventors have identified that a determination of the incremental booking value of a promotion is a particularly useful metric for evaluating the effectiveness of promotions and avoiding unnecessary waste caused by unneeded promotions that are offered to consumers who would purchase a good, service, or experience without the promotion. In this regard, the incremental booking value calculation represents an important insight that can be used in conjunction with a consumer model to predict expected outcomes based on the historical actions taken by consumers.

Calculating the incremental booking value associated with a promotion works in the following manner. Assuming perfect knowledge, the calculation comprises the difference between a first expected booking value (e.g., the expected booking value that would be received from a consumer having access to the promotion) and a second expected booking value (e.g., one that would be received from the consumer without access to the promotion). In general, a consumer is more likely to purchase a product if the consumer is provided with a promotion for the product, so the first expected booking value is typically greater than the second expected booking value.

The incremental benefit of the promotion, then, constitutes the difference between the two. However, because the promotion provides an incentive to the consumer (e.g., a discount), the actual incremental benefit of the promotion is the first expected booking value minus the second expected booking value minus the value of the incentive.

In some situations, the incremental booking value may be zero or negative. This result is found in situations where the consumer has a preexisting interest in purchasing a product, thus the increase in the probability of purchase from use of the promotion does not outweigh the loss from providing the incentive to the consumer.

The incremental booking value associated with a promotion for a particular consumer essentially produces an indication of whether the promotion is worth providing to the particular consumer. Thus, finding ways to predict expected incremental booking value associated with a promotion for a consumer population enables two important determinations. First, it provides an indication of whether there are any consumers for which the promotion will actually increase the expected booking value to a promotion and marketing service. Second, it provides a way to measure which consumers should be targeted with a given promotion. However, utilizing the incremental booking value calculation requires knowledge of what a consumer will do with a promotion versus what the consumer will do without. This calculation cannot be accomplished without perfect information, though.

From this premise, the inventors identified a mechanism for training a predictive model that can evaluate consumer characteristics in conjunction with consumer behavior and historical information (e.g., electronic marketing information), and can predict future behavior of consumers in particular scenarios based on consumer characteristics and historical behavior of similar or similarly situated consumers.

The information that may be utilized to train these models can be harvested by the promotion and marketing service 102. As discussed above, this information may comprise electronic marketing information, which may encompass a wide array of different types of information (e.g., clickstream data, transaction data, location data, context information, communication channel data, discretionary data, or any other data stored by or received by the promotion and marketing service for use in providing electronic communications to consumers).

The inventors have identified several types of electronic marketing information, however, that provide notable predictive impact. Turning now to FIG. 5, a series of these types of electronic marketing information are illustrated, along with the relative magnitudes of their predictive impact. In order of relative importance, these types of electronic marketing information include: "deal_purchase_cnt_030_d," which indicates a number of purchases within a past thirty days; "num_purchases_d," which indicates a number of purchases through the promotion and marketing service; "mobile_email_click_cnt_030_d," which indicates a number of impressions received via the consumer's mobile device that have been clicked by the consumer; "total_gross_revenue_d," which indicates a total revenue that the consumer has provided over all promotions; "tenure_d," which indicates tenure information (e.g., how long a consumer has had an account with the promotion and marketing service); "utm_medium_d," which indicates the way that the consumer came to the promotion and marketing service; "email_click_cnt_030_d," which indicates a number of impressions received via the consumer's regular email that have been clicked on by the consumer; "offer_flag_d," which indicates whether the consumer has received an impression of a particular promotion; "n_deals_w_3zip_030_d," which indicates a number of promotions purchased by the consumer within three zip codes of a given location within the prior thirty days; "avg_booking_amount_d," which indicates an average cost of each of the consumer's bookings; "active_channels_sub_cnt_d," which indicates a number of active channel subscriptions by the consumer; "total_booking_quantity_d," which indicates a total number of bookings that the consumer has made; "max_gross_revenue_d," which indicates the highest price of any promotion purchased by the consumer via the promotion and marketing service; "n_pp_0_15_d," which indicates a number of promotions between $0 and $15 that have been shown to the consumer; and "median_price_d," which indicates a median price of the consumer's bookings.

It should be understood that any given characteristic of a first consumer likely only provides relatively weak predictive impact on the expected actions of other consumers having that particular characteristic. Accordingly, example embodiments utilize machine learning algorithms to combine the relatively weak impacts of a number of consumer characteristics to strengthen the predictive capabilities of the model. In this regard, example embodiments contemplate the use of ensemble methods that are particularly well suited to combining many weak "learners" in an attempt to produce a strong "learner."

Within the class of ensemble statistical models, the inventors have discovered that using gradient boosted regression produces a particularly accurate model of future consumer behavior. A gradient boosted regression model (or any statistical model of this nature) can be trained using a data set describing a control group of consumers who are not provided with a promotion and a target group of consumers who are provided with the promotion to estimate the expected impact of a series of measured characteristics on a consumer's expected incremental booking value. For a given promotion, this model can then be used to predictively analyze the measured characteristics of a new consumer and predict an expected incremental booking value associated with that consumer. Some example embodiments may then rank-order a consumer population based on the expected incremental booking values of the constitute consumers.

Turning now to FIGS. 6A and 6B, example incremental booking values are illustrated in graph form plotted against different deciles of a rank-ordered consumer population. Historical data sets were used to generate these graphs, and thus incremental booking values could be calculated using the actual purchase history of similar or similarly situated consumers. FIG. 6A demonstrates a breakdown of per-consumer incremental booking values in different deciles and illustrates that consumers in the higher deciles demonstrate significantly higher expected incremental booking values than those in lower deciles, which suggests that a top fraction of a consumer population may be very effectively targeted with a promotion, but that all portions of the consumer population will produce added expected value. FIG. 6B demonstrates a breakdown of the total incremental booking values in graph form plotted against total bookings for each decile of the rank-ordered consumer population.

Turning now to the graphs illustrated in FIGS. 7A and 7B, the same deciles of rank-ordered consumer population are shown graphed against the Contribution to Profit ("CP") of the promotion. The CP illustrates the profit to the promotion and marketing service after consideration of the margin of revenue that goes to the merchant. In contrast to the illustrations in FIGS. 6A and 6B, FIGS. 7A and 7B demonstrate that, even if revenues are increased due to targeting lower-decile portions of the consumer population with a promotion, the resulting profit to the promotion and marketing service is negative for all groups save the highest two deciles. In this regard, FIG. 7A illustrates the CP contribution on a per-consumer basis, while FIG. 7B illustrates the total monetary effect of all consumers within each decile.

Turning now to FIGS. 8A and 8B, diagrams are provided that illustrate the monetary impact of offering promotions to different segments of the consumer population. FIG. 8A illustrates the impact of offering a promotion (control 0) versus not offering a promotion (control 1) on the purchase rate, the dollar value of total discounts provided, the dollar value of bookings per consumer, and the after-discount CP per consumer for three categories: the entire consumer population, the top 30% of the consumer population (ranked by incremental booking value) and the top 20% of the consumer population (ranked by incremental booking value).

FIG. 8B, on the other hand, illustrates a summation of incremental booking values, incremental CP, and ROI for these different segments of the population. As shown in FIG. 8B, a promotion, when targeted at the entire population, may produce a negative ROI, but when targeted only at the top 30% of the consumer population, demonstrates a slightly positive ROI, and when targeted at only the top 20% of the consumer population, demonstrates a significant increase in ROI by using example procedures described herein. Thus, this sample data set illustrates the value of the incremental booking value as a measure of effectiveness of promotional efforts.

FIGS. 9A and 9B illustrate the projected impact of offering promotions to different segments of a consumer population, calculated using a statistical model of consumer behavior in accordance with an example embodiment. Similarly, FIGS. 10A and 10B illustrate the differential impact on incremental booking and CP, respectively, of offering a promotion to a top fraction of consumers in a population (arranged by projected incremental booking values) versus offering the same promotion to a random fraction of the consumer population.

Example Operations

Having illustrated a correlation between the expected incremental booking values of a consumer population and the revenue derived from that consumer population, example operations performed by example embodiments will be described. It should be understood that the promotion and marketing service 102 may utilize a consumer model as described previously to predict the expected incremental booking values associated with a population of consumer for various promotions. Using this predictive model, the promotion and marketing service 102 may target promotion impressions to a subset of the consumer population for a variety of reasons (e.g., to maximize the expected revenue derived from a particular promotional offering). FIG. 11 illustrates a flowchart containing a broad description of such operations. FIG. 12 illustrates a flowchart providing greater description of some example operations for estimating incremental booking values associated with a promotion for a consumer. FIG. 13 illustrates a flowchart providing greater description of some example operations for selecting consumers for transmission of impressions. The operations illustrated in FIGS. 11, 12, and 13 may, for example, be performed by a server 104 of a promotion and marketing service 102, with the assistance of, and/or under the control of an apparatus 200.

In operation 1102, apparatus 200 includes means, such as processor 202, memory 204, input/output circuitry 206, communications circuitry 208, or the like, for causing retrieval of information regarding a plurality of consumers. In some embodiments, this operation comprises causing retrieval of historical information regarding transactions associated with a plurality of identifier entities. In some embodiments, this operation includes receiving electronic marketing information from one or more of the plurality of consumers or devices associated with the plurality of identifier entities, from one or more merchants, from a memory, or from a combination thereof. It should be understood that the electronic marketing information may include at least one of: a number of purchases within a past thirty days; a number of purchases made by a consumer through a promotion and marketing service; a number of impressions received via a consumer's mobile device that have been clicked by the consumer; a total revenue that a consumer has provided over all promotions; consumer tenure information; a path that a consumer used to sign up for a promotion and marketing service; a number of impressions received via a consumer's regular email that have been clicked on by the consumer; an indication of whether a consumer has received an impression of a particular promotion; a number of promotions purchased by a consumer within three zip codes of a given location within a prior thirty days; an average cost of each of a consumer's bookings; a number of active channel subscriptions by a consumer; a total number of bookings that a consumer has made; a highest price of any promotion purchased by a consumer via a promotion and marketing service; a number of promotions between $0 and $15 that have been shown to a consumer; and a median price of a consumer's bookings.

In some embodiments, the electronic marketing information may comprise historical information regarding transactions associated with a plurality of identifier entities, wherein the historical information includes, for each identifier entity, a number of purchases associated with the identifier entity within a predetermined period of time; a number of purchases associated with the identifier entity through a promotion and marketing service; click indications regarding a number of impressions associated with the identifier entity; a total revenue associated with the identifier entity over all promotions; registration information associated with the identifier entity; email receipt indications regarding a number of email impressions associated with the identifier entity; and impression receipt indications associated with the identifier entity, a number of promotions purchased by the identifier entity within three zip codes of a given location within a predetermined period of time; an average cost of transactions associated with the identifier entity; a number of active channel subscriptions associated with the identifier entity; a total number of bookings associated with the identifier entity; a highest price of a promotion purchased from a promotion and marketing service that is associated with the identifier entity; impression receipt indications regarding a number of promotions in a predetermined price range associated with the identifier entity; and a median price of bookings associated with the identifier entity.

In operation 1104, apparatus 200 includes means, such as processor 202, modeling circuitry 210, or the like, for training a statistical model of the plurality of consumers or identifier entities based on the retrieved information. In some embodiments, the statistical model comprises an ensemble learning model. In this regard, the ensemble learning model may comprise a gradient boosted regression model. It should be understood that the ensemble learning model may alternative comprise a Random Forest, Support Vector Machine, or Stochastic Gradient Boosted Decisions Tree. Moreover, some example embodiments may utilize logistic regression, linear regression, neural networks, or rule based systems with or without explicitly modeling feature interactions.

In operation 1106, apparatus 200 may optionally include means, such as processor 202, modeling circuitry 210, or the like, for predicting, using the statistical model, an expected incremental booking value associated with the promotion for each consumer of the plurality of consumers. In this regard, predicting expected incremental booking values associated with a promotion is described in greater detail below in association with FIG. 12.

In some embodiments, optional operation 1106 may alternatively include means, such as processor 202, modeling circuitry 210, or the like, for estimating using the statistical model, values for expected identifier entity transaction requests associated with each of the plurality of identifier entities. In this regard, an identifier entity transaction request may comprise a purchase transaction request that may or may not include a request to redeem a promotion. The values for an expected identifier entity transaction request may, in turn, comprise expected transaction data (e.g., expected purchase amounts, expected products or services purchased, expected prices, expected promotion redemption requests, an expected incremental booking value, or the like).

In operation 1108, apparatus 200 includes means, such as processor 202, modeling circuitry 210, or the like, for selecting a subset of the plurality of consumers or identifier entities for receiving impressions of the promotion. Selection of this subset is described in greater detail below in connection with FIG. 13.

Optionally, in operation 1110, apparatus 200 may also means, such as communications circuitry 208, or the like, for transmitting an impression of the promotion to each consumer (or identifier entity) in the subset.

Turning now to FIG. 12, a description is provided of some example operations for predicting an expected incremental booking value associated with a promotion for a consumer.

Turning first to operation 1202, the apparatus 200 includes means, such as processor 202, modeling circuitry 210, or the like, for estimating, using the statistical model, a first expected booking value that would be received from the consumer during a first time period in an instance in which the consumer has access to the promotion. In this regard, the consumer model trained in operation 1104 may accept, as inputs, electronic marketing information regarding a particular consumer, and based on the input electronic marketing information, the modeling circuitry 210 may calculate an expected booking value based on past booking values associated with similar promotions and for similarly situated consumers.

In operation 1204, apparatus 200 includes means, such as processor 202, modeling circuitry 210, or the like, for estimating, using the statistical model, a second expected booking value that would be received from the consumer in an instance in which the consumer does not have access to the promotion. The consumer modeling circuitry 210 may calculate this expected booking value based on past booking values associated for similarly situated consumers. It should be understood that operations 1202 and 1204 may be executed in any order and may even be performed in batch prior to the other operations of the procedures described herein.

In operation 1206, apparatus 200 includes means, such as processor 202, modeling circuitry 210, or the like, for calculating a first difference value by subtracting the second expected booking value from the first expected booking value. This calculation represents an important insight identified by the inventors, which is that by enabling a comparison of the actions of similar, and similarly situated consumers, a consumer model can predict expected outcomes based on the historical actions taken by those similar and/or similarly situated consumers. In some embodiments, the expected incremental booking value may be set to this first difference value, which represents the total revenue received as a result of each transaction. It may not be necessary to factor in the discount provided by application of the promotion if the only use of the calculation will be to rank the consumers and the promotion comprises a fixed discount campaigns (e.g., a $10 discount for all purchases). For instance, in such situations, any subsequent rankings based on the first difference would not be changed by factoring in this fixed discount. In other embodiments, however, it is necessary to factor in the discount, in which case the operation proceeds to optional operation 1208.

Optionally, in operation 1208, apparatus 200 may include means, such as processor 202, modeling circuitry 210, or the like, for calculating a second difference value by subtracting a discount value associated with the promotion from the first difference value. In this regard, the expected incremental booking value may be set to the second difference value, which represents the after-expense incremental gain in revenue produced by offering a promotion to the consumer.

Finally, it should be noted that the operations of FIG. 12 are discussed in connection with estimation of an incremental booking value associated with a promotion for a single consumer. However, the operations in FIG. 12 may in some embodiments be repeated for any number of consumers. This fact is illustrated in FIG. 12 by the dotted lines connecting operation 1206 to operation 1202 (in an instance in which operation 1208 does not occur) and operation 1208 to operation 1202 (in an instance in which operation 1208 takes place).

Turning now to FIG. 13, a description is provided of some example operations selecting consumers to receive impressions of a promotion. In operation 1302, apparatus 200 includes means, such as processor 202, modeling circuitry 210, or the like, for ranking the plurality of consumers by incremental booking values associated with the promotion that correspond to each of the plurality of consumers.

Subsequently, in operation 1304, apparatus 200 includes means, such as processor 202, modeling circuitry 210, or the like, for selecting a predetermined percentage of highest ranked consumers. It should be understood that the subset of the plurality of consumers to target comprises the predetermined percentage of highest ranked consumers. This predetermined percentage may be, for instance, a top 10%, 20%, or 30% of ranked consumers.

In some embodiments, selection of the subset of the plurality of consumers maximizes expected revenue generated by the promotion. To this end, while the ranking of the consumers affects the expected revenue generated by the promotion, the size of the subset may also affect this expected revenue generation, and depending on preexisting interest in the good, service, or experience offered by the promotion, increasing or shrinking the size of the subset may either increase or decrease the expected revenue produced by offering the promotion. As a result, maximizing expected revenue may require utilizing a size that is not a predetermined percentage of highest ranked consumers, but instead is a variable size that is calculated to maximize the expected revenue from offering the promotion.

It should also be understood that maximizing expected revenue is not the only metric that might be used to determine the set of users who receive the promotion. In some embodiments, this set may be dictated by other business processes, such as the available budget for marketing promotions, the merchant capacity, a predefined target incremental revenue desired from the marketing campaign, or the like. In any event, some embodiments may dynamically select the number of consumers to receive a promotion, while other embodiments utilize a fixed number of set of customers having certain characteristics.

FIGS. 11, 12, and 13 illustrate flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will be understood that one or more blocks of the flowcharts, and combinations of blocks in the flowcharts, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for improved machine learning with a statistical model to facilitate improved targeting of a promotion, the apparatus comprising:
    a processor of a server of a promotion and marketing service, wherein the processor is configured to cause retrieval, by communications circuitry of the server and from a database of the promotion and marketing service, of historical information regarding transactions associated with a plurality of identifier entities,
    wherein each identifier entity represents a specific consumer and is associated with one or more consumer devices used by the consumer to access the promotion and marketing service, and
    wherein the historical information includes measured characteristics including, for each identifier entity, (i) a number of purchases associated with the identifier entity within a predetermined period of time, (ii) a number of purchases associated with the identifier entity through the promotion and marketing service, (iii) click indications regarding a number of impressions associated with the identifier entity, (iv) a total revenue associated with the identifier entity over all promotions, (v) registration information associated with the identifier entity, (vi) email receipt indications regarding a number of email impressions associated with the identifier entity, and (vii) impression receipt indications associated with the identifier entity; and
    modeling circuitry, which includes hardware components, of the server of the promotion and marketing service, wherein the modeling circuitry is configured to
    train the statistical model using the retrieved historical information, wherein training includes predicting expected incremental booking values by offering the promotion to the plurality of identifier entities,
    wherein the statistical model is a gradient boosted regression model, and the training includes using a retrieved historical information data set describing a control group of consumers who are not provided with a promotion and a target group of consumers who are provided with the promotion to estimate expected impact of the measured characteristics on expected incremental booking value, and for a given promotion the gradient boosted regression model predictively analyzes the measured characteristics of a selected consumer and predicts the expected incremental booking value associated with the selected consumer, and
    estimate, using the statistical model, values for expected identifier entity transaction requests associated with each of the plurality of identifier entities, wherein the processor is further configured to select, based on the estimated values, a subset of identifier entities to receive impressions of the promotion and thereby differentiate between identifier entities who are predicted to require a promotion to prompt a purchase and those who are not.

2. The apparatus of claim 1, wherein the processor is configured to select the subset of identifier entities by:
    ranking the plurality of identifier entities; and
    selecting a predetermined percentage of highest ranked identifier entities,
    wherein the subset of identifier entities to target comprises the predetermined percentage of highest ranked identifier entities.

3. The apparatus of claim 1, wherein the processor is configured to select the subset of identifier entities that maximizes expected revenue generated by the promotion.

4. The apparatus of claim 1, further comprising:
    communications circuitry configured to transmit an impression of the promotion to each identifier entity in the subset.

5. The apparatus of claim 1, wherein the processor is configured to cause the retrieval of the historical information from at least one of the plurality of identifier entities, one or more merchants, or a memory.

6. The apparatus of claim 5, wherein the retrieved historical information further includes, for each identifier entity, at least one of: (viii) a number of promotions purchased by the identifier entity within three zip codes of a given location within a predetermined period of time; (ix) an average cost of transactions associated with the identifier entity; (x) a number of active channel subscriptions associated with the identifier entity; (xi) a total number of bookings associated with the identifier entity; (xii) a highest price of a promotion purchased from the promotion and marketing service that is associated with the identifier entity; (xiii) impression receipt indications regarding a number of promotions in a predetermined price range associated with the identifier entity; and (xiv) a median price of bookings associated with the identifier entity.

7. A method for improved machine learning with a statistical model to facilitate improved targeting of a promotion, the method comprising:
    retrieving, by a processor of a server of a promotion and marketing service and from a database of the promotion and marketing service, historical information regarding transactions associated with a plurality of identifier entities,
    wherein each identifier entity represents a specific consumer and is associated with one or more consumer devices used by the consumer to access the promotion and marketing service, and
    wherein the historical information includes measured characteristics including, for each identifier entity, (i) a number of purchases associated with the identifier entity within a predetermined period of time, (ii) a number of purchases associated with the identifier entity through the promotion and marketing service, (iii) click indications regarding a number of impressions associated with the identifier entity, (iv) a total revenue associated with the identifier entity over all promotions, (v) registration information associated with the identifier entity, (vi) email receipt indications regarding a number of email impressions associated with the identifier entity, and (vii) impression receipt indications associated with the identifier entity;

training, by modeling circuitry, which includes hardware components, of the server of the promotion and marketing service, the statistical model using the retrieved historical information;

wherein the training includes predicting expected incremental booking values by offering the promotion to the plurality of identifier entities, wherein the statistical model is a gradient boosted regression model, and the training includes using a retrieved historical information data set describing a control group of consumers who are not provided with a promotion and a target group of consumers who are provided with the promotion to estimate expected impact of the measured characteristics on expected incremental booking value, and for a given promotion the gradient boosted regression model predictively analyzes the measured characteristics of a selected consumer and predicts the expected incremental booking value associated with the selected consumer, estimating, by the modeling circuitry and using the statistical model, values for expected identifier entity transaction requests associated with each of the plurality of identifier entities; and selecting, by the processor and based on the estimated values, a subset of identifier entities to receive impressions of the promotion and thereby differentiate between identifier entities who are predicted to require a promotion to prompt a purchase and those who are not.

8. The method of claim 7, wherein selecting the subset of identifier entities includes:
ranking the plurality of identifier entities; and
selecting a predetermined percentage of highest ranked identifier entities,
wherein the subset of identifier entities to target comprises the predetermined percentage of highest ranked identifier entities.

9. The method of claim 8, wherein selecting the subset of identifier entities maximizes expected revenue generated by the promotion.

10. The method of claim 7, further comprising:
transmitting, by communications circuitry, an impression of the promotion to each identifier entity in the subset.

11. The method of claim 7, wherein retrieving historical information regarding the transactions associated with the plurality of identifier entities comprises:
retrieving the historical information from at least one of the plurality of identifier entities, one or more merchants, or a memory.

12. The method of claim 11, wherein the retrieved historical information further includes, for each identifier entity, at least one of: (viii) a number of promotions purchased by the identifier entity within three zip codes of a given location within a predetermined period of time; (ix) an average cost of transactions associated with the identifier entity; (x) a number of active channel subscriptions associated with the identifier entity; (xi) a total number of bookings associated with the identifier entity; (xii) a highest price of a promotion purchased from the promotion and marketing service that is associated with the identifier entity; (xiii) impression receipt indications regarding a number of promotions in a predetermined price range associated with the identifier entity; and (xiv) a median price of bookings associated with the identifier entity.

13. An apparatus for improved machine learning with a statistical model to facilitate improved targeting of a promotion, the apparatus comprising:

means for retrieving historical information regarding transactions associated with a plurality of identifier entities,
wherein each identifier entity represents a specific consumer and is associated with one or more consumer devices used by the consumer to access the promotion and marketing service, and
wherein the historical information includes measured characteristics including, for each identifier entity, (i) a number of purchases associated with the identifier entity within a predetermined period of time, (ii) a number of purchases associated with the identifier entity through a promotion and marketing service, (iii) click indications regarding a number of impressions associated with the identifier entity, (iv) a total revenue associated with the identifier entity over all promotions, (v) registration information associated with the identifier entity, (vi) email receipt indications regarding a number of email impressions associated with the identifier entity, and (vii) impression receipt indications associated with the identifier entity;

means for training the statistical model using the retrieved historical information; wherein the training includes predicting expected incremental booking values by offering the promotion to the plurality of identifier entities, wherein the statistical model is a gradient boosted regression model, and the training includes using a retrieved historical information data set describing a control group of consumers who are not provided with a promotion and a target group of consumers who are provided with the promotion to estimate expected impact of the measured characteristics on expected incremental booking value, and for a given promotion the gradient boosted regression model predictively analyzes the measured characteristics of a selected consumer and predicts the expected incremental booking value associated with the selected consumer, means for estimating, using the statistical model, values for expected identifier entity transaction requests associated with each of the plurality of identifier entities; and means for selecting, based on the estimated values, a subset of identifier entities to receive impressions of the promotion and thereby differentiate between identifier entities who are predicted to require a promotion to prompt a purchase and those who are not.

14. The apparatus of claim 13, wherein the means for selecting the subset of identifier entities includes:
means for ranking the plurality of identifier entities; and
means for selecting a predetermined percentage of highest ranked identifier entities,
wherein the subset of identifier entities to target comprises the predetermined percentage of highest ranked identifier entities.

15. The apparatus of claim 13, wherein the means for selecting the subset of identifier entities comprises means for selecting the subset of identifier entities to maximize expected revenue generated by the promotion.

16. The apparatus of claim 13, further comprising:
means for transmitting an impression of the promotion to each identifier entity in the subset.

17. The apparatus of claim 13, wherein the means for retrieving historical information regarding the transactions associated with the plurality of identifier entities comprises:

means for retrieving the historical information from at least one of the plurality of identifier entities, one or more merchants, or a memory.

18. The apparatus of claim 17, wherein the retrieved historical information further includes, for each identifier entity, at least one of: (viii) a number of promotions purchased by the identifier entity within three zip codes of a given location within a predetermined period of time; (ix) an average cost of transactions associated with the identifier entity; (x) a number of active channel subscriptions associated with the identifier entity; (xi) a total number of bookings associated with the identifier entity; (xii) a highest price of a promotion purchased from the promotion and marketing service that is associated with the identifier entity; (xiii) impression receipt indications regarding a number of promotions in a predetermined price range associated with the identifier entity; and (xiv) a median price of bookings associated with the identifier entity.

\* \* \* \* \*